(12) United States Patent
Boyle et al.

(10) Patent No.: US 10,765,976 B2
(45) Date of Patent: Sep. 8, 2020

(54) OPEN BOTTOM MULTIPLE CHANNEL GAS DELIVERY DEVICE FOR IMMERSED MEMBRANES

(71) Applicant: BL TECHNOLOGIES, INC., Minnetonka, MN (US)

(72) Inventors: Gavin James Boyle, Oakville (CA); Zamir Alam, Oakville (CA); Reid Bayly, Oakville (CA); Michael David Theodoulou, Milton (CA); Hongde Zhou, Guelph (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 797 days.

(21) Appl. No.: 14/442,807

(22) PCT Filed: Mar. 15, 2013

(86) PCT No.: PCT/US2013/032213
§ 371 (c)(1),
(2) Date: May 14, 2015

(87) PCT Pub. No.: WO2014/077888
PCT Pub. Date: May 22, 2014

(65) Prior Publication Data
US 2015/0290563 A1    Oct. 15, 2015

Related U.S. Application Data

(60) Provisional application No. 61/726,092, filed on Nov. 14, 2012.

(51) Int. Cl.
*B01D 29/66* (2006.01)
*B01D 61/22* (2006.01)
(Continued)

(52) U.S. Cl.
CPC ............ *B01D 29/66* (2013.01); *B01D 61/20* (2013.01); *B01D 61/22* (2013.01); *B01D 63/02* (2013.01);
(Continued)

(58) Field of Classification Search
CPC ........ B01D 29/66; B01D 65/08; B01D 63/02; B01D 61/22; B01D 61/20; B01D 2321/04;
(Continued)

(56) References Cited

U.S. PATENT DOCUMENTS

| 3,424,443 | A | * | 1/1969 | Thayer | ................ B01F 3/04262 210/220 |
| 6,245,239 | B1 | * | 6/2001 | Cote | ...................... B01D 61/18 210/321.79 |
| 6,547,968 | B1 | | 4/2003 | Rabie et al. | |
| 2005/0006308 | A1 | | 1/2005 | Cote et al. | |
| 2006/0260998 | A1 | * | 11/2006 | Suzuki | ................... B01D 61/20 210/321.69 |
| 2007/0095754 | A1 | | 5/2007 | Livingston et al. | |

FOREIGN PATENT DOCUMENTS

| EP | 1716914 A1 | 11/2006 |
| WO | 0021890 A1 | 4/2000 |

(Continued)

OTHER PUBLICATIONS

A PCT Search Report and Written Opinion issued in connection with corresponding PCT Application No. PCT/US2013/032213 dated Jul. 4, 2013.

(Continued)

*Primary Examiner* — Liam Royce

(57) ABSTRACT

A method of air scouring an immersed membrane is described in this specification. The method comprising a step of adjusting one or more aeration parameters: between successive permeation, back pulse or relaxation cycles; during a permeation cycle; or, between a permeation cycle and a backpulse or relaxation cycle.

12 Claims, 8 Drawing Sheets

(51) Int. Cl.
*B01D 65/08* (2006.01)
*B01D 63/02* (2006.01)
*B01D 61/20* (2006.01)
*C02F 1/44* (2006.01)
*C02F 1/78* (2006.01)
*C02F 1/72* (2006.01)
*C02F 1/74* (2006.01)
*B01F 3/04* (2006.01)
*B01D 65/02* (2006.01)

(52) U.S. Cl.
CPC ............. *B01D 65/08* (2013.01); *B01D 65/02* (2013.01); *B01D 2313/26* (2013.01); *B01D 2315/20* (2013.01); *B01D 2321/04* (2013.01); *B01D 2321/185* (2013.01); *B01F 3/04241* (2013.01); *C02F 1/444* (2013.01); *C02F 1/727* (2013.01); *C02F 1/74* (2013.01); *C02F 1/78* (2013.01); *C02F 2303/14* (2013.01)

(58) Field of Classification Search
CPC .......... B01D 2313/26; B01D 2321/185; B01D 2315/20; B01D 65/02; C02F 1/78; C02F 1/727; C02F 1/74; C02F 2303/14; C02F 1/444; B01F 3/04241
See application file for complete search history.

(56) References Cited

FOREIGN PATENT DOCUMENTS

| | | |
|---|---|---|
| WO | 2005082498 A1 | 9/2005 |
| WO | 2006029465 A1 | 3/2006 |
| WO | 2011028341 A1 | 3/2011 |
| WO | 2012057902 A1 | 5/2012 |

OTHER PUBLICATIONS

Unofficial English Translation of Russian Office Action issued in connection with corresponding RU Application No. 2015116948 dated Nov. 11, 2016.
Canadian Patent Application No. 2,891,409, Office Action dated Jan. 11, 2019.
Canadian Patent Application No. 2,891,409, Office Action dated Oct. 22, 2019.
Korean Patent Application No. 10-2015-7015217, Office Action dated Mar. 19, 2019.
European Patent Application No. 13717600.4, Office Action dated Mar. 28, 2019.

* cited by examiner

OPEN BOTTOM MULTIPLE CHANNEL GAS DELIVERY DEVICE FOR IMMERSED MEMBRANES

CROSS-REFERENCE TO RELATED APPLICATIONS

For the United States of America, this application claims the benefit of U.S. Provisional Application No. 61/726,092, filed Nov. 14, 2012, which is hereby incorporated by reference.

FIELD

This specification relates to a gas delivery device for use, for example, in supplying bubbles to inhibit fouling of an immersed filtering membrane.

BACKGROUND

International Publication Number 2011/028341, Gas Sparger for a Filtering Membrane, describes a gas sparger that produces an intermittent flow of bubbles even if provided with a continuous gas flow. The sparger has a housing to collect a pocket of gas and a conduit to release some of the gas from the pocket when the pocket reaches a sufficient size. A large sparger can be divided into a plurality of units each having a conduit. A gas supply pipe has at least one hole aligned with each unit to deliver air to each of the units. International Publication Number 2011/028341 is incorporated by reference.

INTRODUCTION

A method of air scouring an immersed membrane is described in this specification. The method comprises a step of adjusting one or more aeration parameters during a permeation cycle, or between a permeation cycle and a back pulse or relaxation cycle, or between successive cycles. The method may be used with a gas delivery device described in this specification in which a supply of gas is provided to a manifold with multiple ports connected to multiple conduits. The method may further comprise bringing a flow of pressurized gas into a tank to near or below the bottom of a membrane module. At about this elevation, the flow of pressurized gas is split into multiple flows of pressurized gas. Each of the multiple flows of pressurized gas is directed to a different lateral position and then released as bubbles.

DETAILED DESCRIPTION

Figure 1:
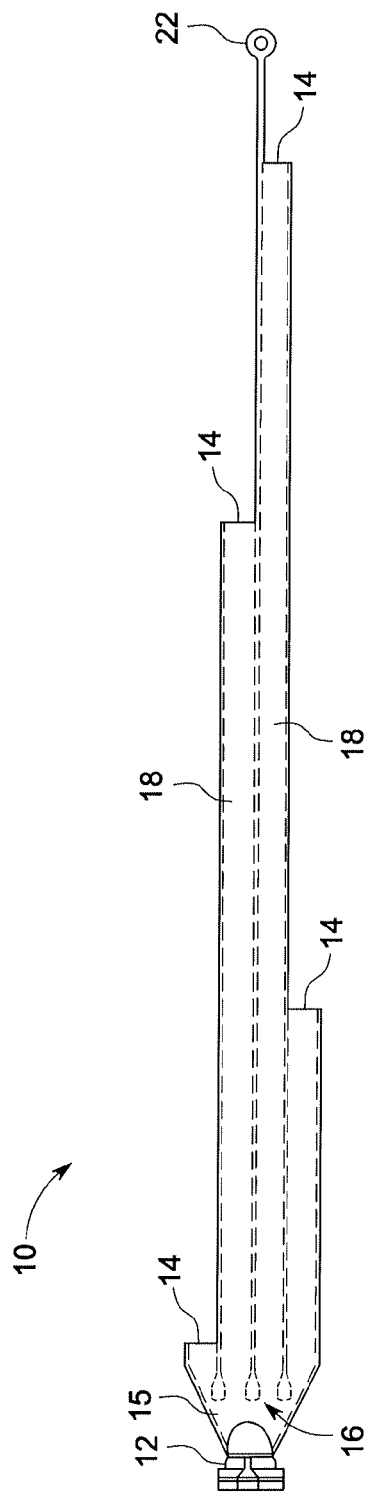
FIG. 1 is a top view of a gas delivery device.

In a gas sparger as described in International Publication Number 2011/028341, a unit of the sparger that receives a larger flow rate of input gas will produce pulses of bubbles at a higher frequency. In order to uniformly clean a membrane cassette, it may be desirable to have each unit operate at near the same frequency. The holes of the gas supply pipe are made small to help equalize the gas flow rate between holes feeding different units of the sparger. However, if the gas supply pipe is installed out of level by as few as 6 mm over a length of about 500 mm, the holes at higher elevation will have a noticeably larger gas flow rate. In addition, solids entering the gas supply pipe during maintenance periods when the gas supply is turned off can dry out or agglomerate when the gas is turned back. Occasionally, a solid particle is formed in the gas supply tube that is large or rigid enough to be lodged into one of the holes and to restrict or block the hole. A partially or completely blocked hole will in turn lead to poor distribution of gas to the membranes and allow solids to accumulate on the membranes. A gas delivery device will be described below that can be used as an alternative to such a gas supply pipe either with or without a further gas sparger.

FIGS. 1 to 4 show different views of a gas delivery device 10. Alternatively, the gas delivery device 10 may be called an aerator or a sparger. In use, the gas delivery device 10 is immersed in a liquid, typically water, for example activated sludge. Pressurized gas is supplied to an inlet 12 of the gas delivery device and is emitted as bubbles from a plurality of outlets 14. The gas is typically air, but in some applications another gas, for example biogas, nitrogen, ozone or oxygen may be used. The gas delivery device 10 shown has four outlets 14, but there may alternatively be more or less outlets 14.

The inlet 12 is separated from the outlets 14 by a plurality of ports 16. Each outlet 14 communicates with a port 16 through a channel 18. Part of the gas delivery device 10 from the inlet 12 to the ports 16 functions as a manifold 15, alternatively called a plenum, to distribute the gas entering through the inlet 12 among the channels 18. The inlet 12, ports 16 and outlets 14 are located at generally the same elevation but spaced horizontally. The gas flows generally horizontally in the channels 18.

The area of the ports 16 is less than the area of the channels 18, or less than the area of the smallest of the channels 18 if they have different areas. For example, the channels 14 may have a cross sectional area that is three times or more than the cross sectional area of the ports 16. The ports 16 restrict the flow of gas into the channels 14. The restriction provided by the ports 16 helps to distribute the total airflow more nearly equally among the channels 18. Decreasing the area of the ports 16 produces a more nearly equal flow in the channels 18 but also increases head loss through the ports 16. The ports 16 may be made all of the same area. The area of the ports 16 may be reduced until the flow is adequately distributed among the channels 18. Optionally, a port 16 opening into a long or narrow channel 18 may be larger than a port 16 opening into a short or wide channel 18 to help equalize the flow among the channels 18. Alternatively, one or more ports 16 may be made larger than other ports 16 to intentionally increase the relative airflow through one or more channels 18. This may be done, for example, to provide more air to the extremities of an immersed membrane cassette to counteract a tendency for water to be lifted preferentially through the center of a cassette.

Figure 2:
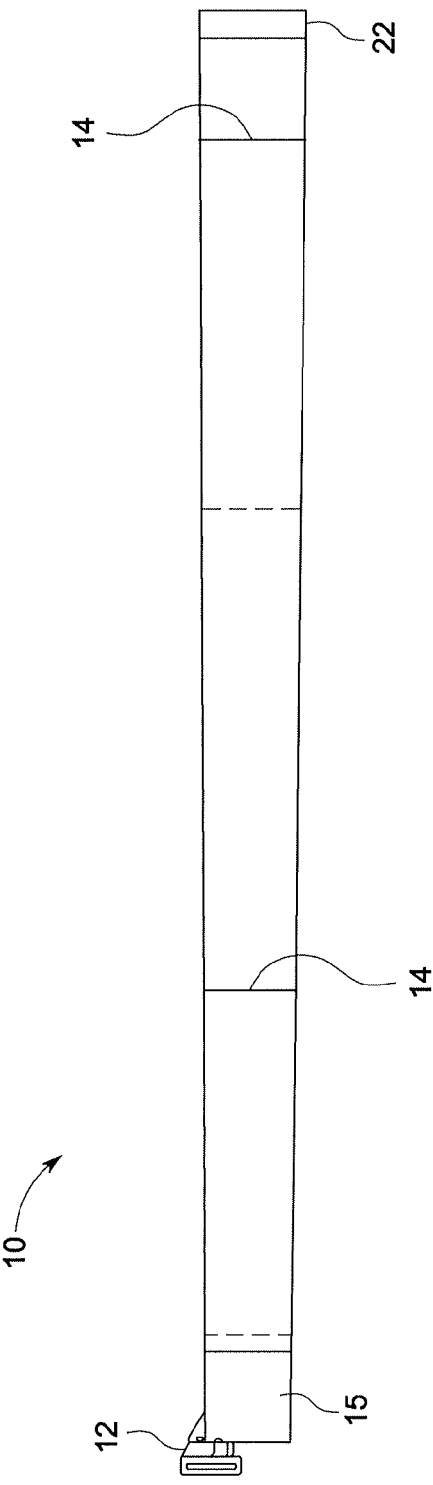
FIG. 2 is a bottom view of the gas delivery device of FIG. 1.
Figure 3:
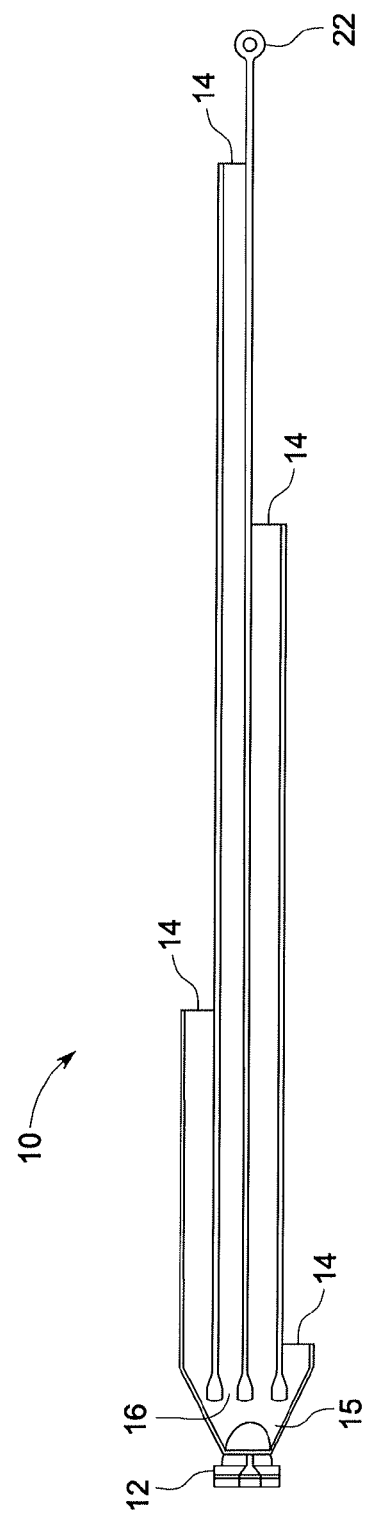
FIG. 3 is a side view of the gas delivery device of FIG. 1.
Figure 4A:
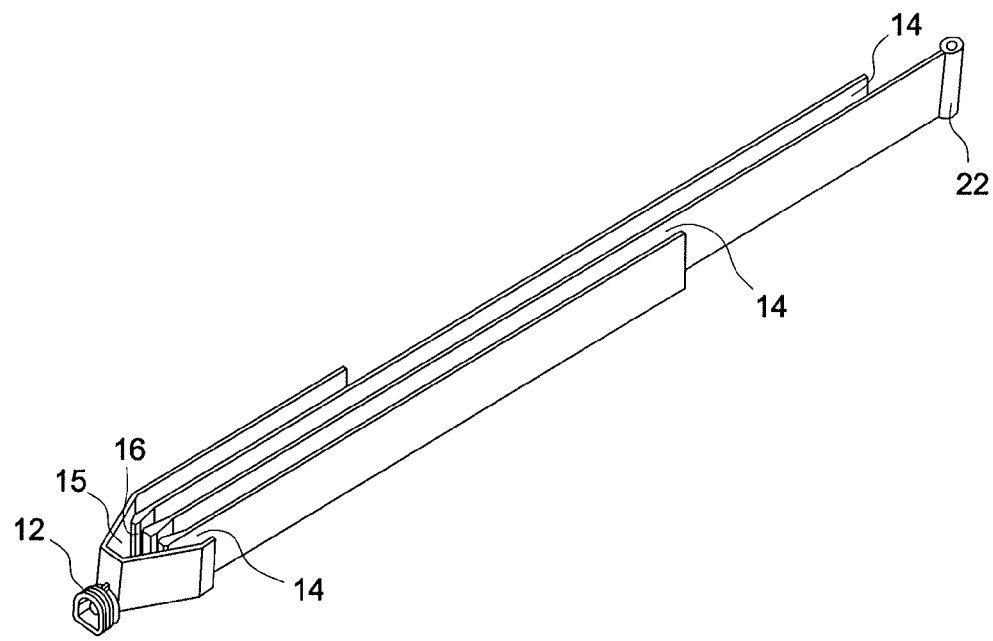
FIG. 4A is an isometric view of the bottom of the gas delivery device of FIG. 1.
Figure 4B:
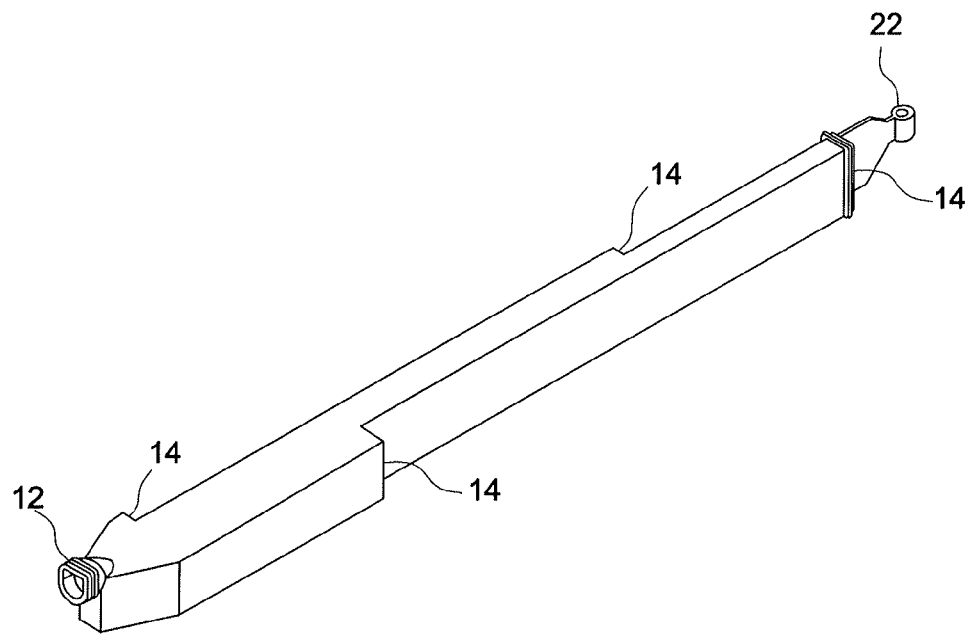
FIG. 4B is an isometric view of the top of the gas delivery device of FIG. 1.

As shown in FIG. 1 and FIG. 2, the ports 16 are located close to each other in the horizontal direction. In this way, if the gas delivery device 10 is mounted a few degrees out of level, there is very little difference in elevation between the ports 16. In particular, the largest horizontal distance between two ports 16 is less than the average horizontal distance between adjacent outlets 14, or less than half of the average horizontal distance between adjacent outlets 14. The largest horizontal distance between the ports 16 is also less than 25%, or less than 10%, of the largest distance from a port 16 to an outlet 14. This helps produce a more nearly equal distribution of the gas among the channels 18 compared to an ordinary aerator in the form of a tube with holes when the gas delivery device 10 is mounted out of level. Because the ports 16 are primarily responsible for equalizing flow between channels 18, the outlets 14 can be made larger, for example as large as the cross sectional area of the channels 18, so that any solids that accumulate in a channel 18 are unlikely to block the outlet 14.

The gas delivery device 10 has its outlets 14 spaced generally in a line. Alternatively, other configurations may be used. For example, channels 18 could extend along a line but in both directions from the inlet 12. In another example, the channels 18 could radiate from the inlet 12 like spokes from a wheel hub.

Optionally, the top of the channels 18 may be pointed slightly upwards. In this way, if the gas delivery device is inadvertently mounted with a slightly downwards slant, then gas will not be trapped in the channels 18 when the supply of gas is off. A slight upwards slant may also help compensate for differences between the lengths of the channels 18.

Figure 7:
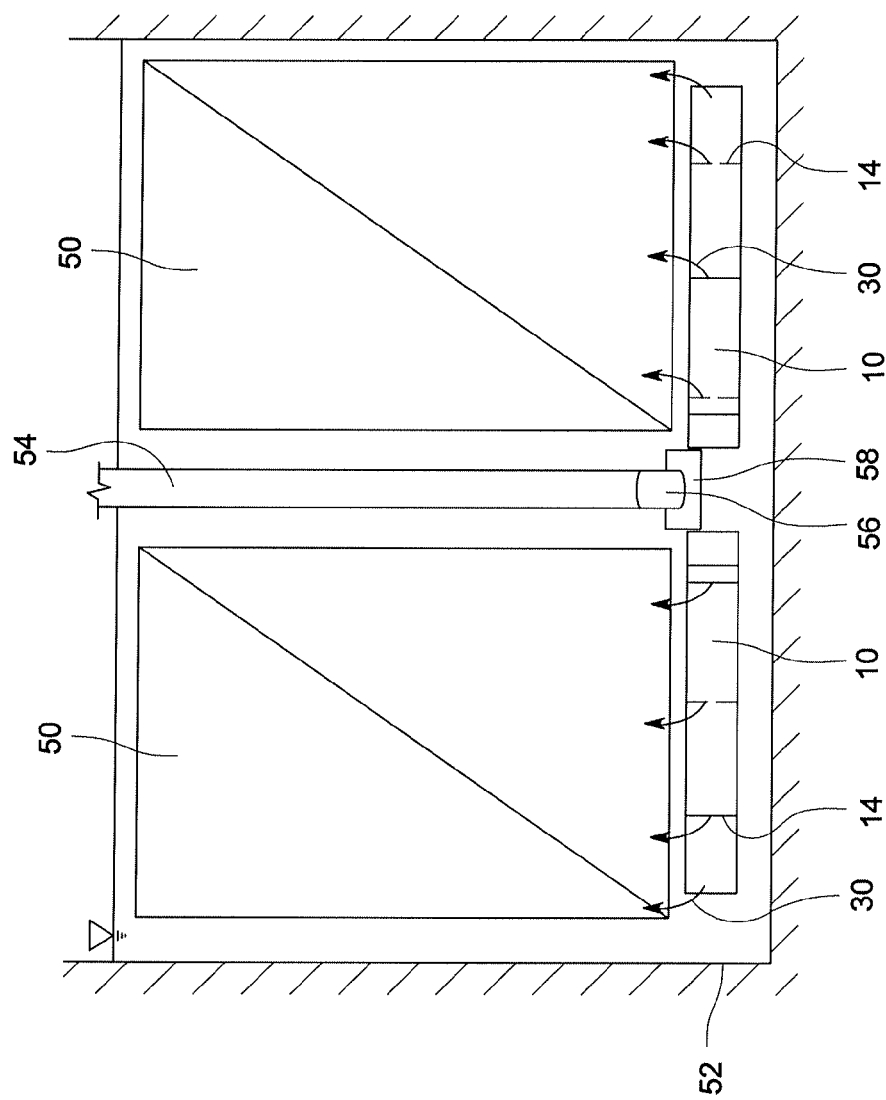
FIG. 7 is a schematic cross section of a tank having a suction driven membrane module and an aeration system immersed in the tank.

Referring to FIG. 7, the gas delivery device 10 may be used, for example, to provide bubbles for scouring an immersed membrane module 50. The membrane module 50 contains a plurality of ultrafiltration or microfiltration membranes. Permeate is withdrawn from the membrane module by way of a suction pump in communication with the inside of the membranes. A typical filtration cycle comprises periods of filtration interrupted by backwashing, alternatively called backpulsing, procedures or relaxation periods in which there is no filtration. A device with a line of outlets 14 is particular suited for providing bubbles to membrane modules with rectangular elements such as flat sheet modules or ZEEWEED™ hollow fiber elements sold by GE Water & Process Technologies.

The gas delivery device 10 is immersed in a tank 52 containing one or more membrane modules 50. The gas delivery device 10 may be mounted separately in the tank 52 or attached to the membrane modules 50. Gas may be brought down into the tank from a riser pipe 54 and then spread horizontally through as header 56. Saddles 58 attached to the header 56 receive gas from the header and carry the gas to a line of gas deliver devices 10 oriented perpendicularly to the header 56 in a generally horizontal plane. Optionally, a gas delivery device 10 may be connected directly to a header 56 or riser pipe 54. Streams of bubbles 30 are discharged from the outlets 14 at various lateral positions relative to a membrane module 50. The gas flowing to each lateral position bypasses any intermediate lateral positions. The bubbles 30 may be allowed to rise directly to the membranes to clean them or inhibit fouling. Alternatively, a transducer may be placed above the gas delivery device 10 to modify its output before the bubbles reach the membranes. For example, a diffuser may be placed over an outlet to disperse the bubbles over a wider area.

Figure 5:
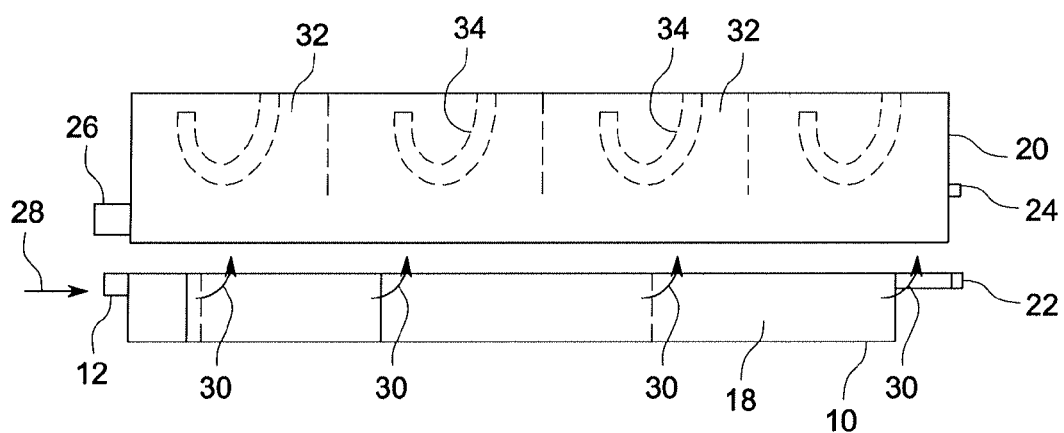
FIG. 5 is a side view of the gas delivery device of FIG. 1 in combination with an intermittent gas sparger.

FIG. 5 illustrates another transducer option in which an intermittent gas sparger 20, for example of the type shown in International Publication Number 2011/028341, is associated with the gas delivery device. Pressurized gas 28 is split in the gas delivery device into four bubble streams 30. Each bubble stream 30 rises into a different cavity 32 of the intermittent air sparger 20. Gas flowing through a conduit 18 to a particular cavity 32 bypasses any intervening cavities 32.

Each cavity 32 has a discharge conduit 34, in the form a J-shaped tube in the example of FIG. 5, which acts like an inverted siphon to discharge intermittent pulses of air from the cavity 32. Bubbles emitted from the gas delivery device 10 first collect in the cavity 32 forming a pocket of gas in the top of the cavity 32. No gas is emitted from the cavity 32 until the pocket of gas expands to reach the low point of the discharge conduit 34. At that time, the pocket of gas empties out of the cavity 32 through the conduit 34 and the process repeats. In this way, a continuous stream of bubbles 30 from the gas delivery device 10 is converted into an intermittent flow of bubbles from the intermittent gas sparger 20.

In FIG. 5, the gas delivery device 10 is shown mounted separately and below the intermittent gas sparger 20. Alternatively, the gas delivery device 10 may be mounted to the intermittent gas sparger 20. In the example shown, the inlet 12 may be fitted into a receptacle 26 of the intermittent gas sparger 20. A fastener (not shown) is then placed through an eyelet 22 on the gas delivery device 10 and into an abutment 24 on the intermittent gas sparger 20. This results in the gas delivery device 10 being located partially within the intermittent gas sparger 20. However, the outlets 14 are below the conduits 34 and still discharge into water below the lower limit of the pockets of gas in the cavities 32.

Figure 6:
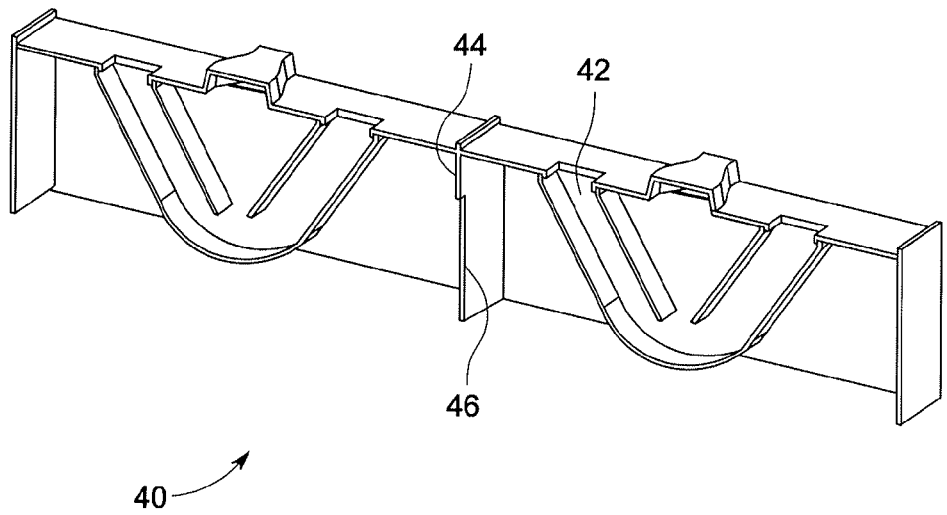
FIG. 6 is an isometric cross sectional view of the bottom of an alternative intermittent gas sparger.

FIG. 6 is an isometric cross sectional view of the bottom of an alternative intermittent sparger 40. In this example, multi-port conduits 42 provide two or more outlet paths extending upwards from the low point of each multi-port conduits 42. A divider 44 between adjacent multi-port conduits 42 has a slot 46 extending from the bottom of the divider 44 to above the low point of the multi-port conduits 42. Each cavity with a multi-port conduit 42 replaces two cavities with a single outlet conduit and so avoids a need to balance the supply of gas between the two replaced cavities. The slot 46 in the divider 44 helps equalize the air supply to the cavities. Gas may flow in either direction through the slot 46 but the net flow will be from a cavity that receives a larger gas flow to a cavity that receives a lower air flow.

The gas delivery device 10 is preferably an open-bottomed structure. For example, the channels 18 are formed by side walls and a top. The channels 18 are open at the bottom and, preferably, at their ends. The outlets 14 may be defined by the open end of the channels 18. The manifold 15 between the inlet 12 and the ports 16 is preferably also open at the bottom. The ports 16 are preferably slots also open at the bottom of the gas delivery device 10. In this way, solids caught anywhere in the gas delivery device 10 beyond the inlet 12 can fall or be expelled downwards out of the gas delivery device 10. Having such a short and simple pathway for solids to leave helps prevent fouling in the gas delivery device 10. In the event that solids somehow still accumulate in the gas delivery device, the open-bottomed structure makes it easy to locate and remove the solids, for example by spraying water into the bottom of the gas delivery device 10.

The open-bottomed construction of the gas delivery device 10 also helps accommodate a range of input gas flow rates. At low flow rates, water enters into the gas delivery device 10 and reduces the size of the ports 16 and channels 18. At higher gas flow rates, less water enters into the gas delivery device 10 and the ports 16 and channels 18 increase in size. The gas delivery device 10 can be made to provide a well distributed flow of air at supplied air flow rates that vary, for example, from a low flow rate to a high flow rate that is two or more times as large as the low flow rate. The gas delivery device 10 may also be operated at one or more distinct intermediate flow rates or at flow rates that vary smoothly over time. This is done without the gas delivery device 10 fouling rapidly or providing excessive back pressure at either flow rate. In comparison, aerators in the form of a horizontal tube with a series of holes can foul and provide a poor distribution of air at low flow rates and excessive back pressure at high flow rates.

Figure 8:
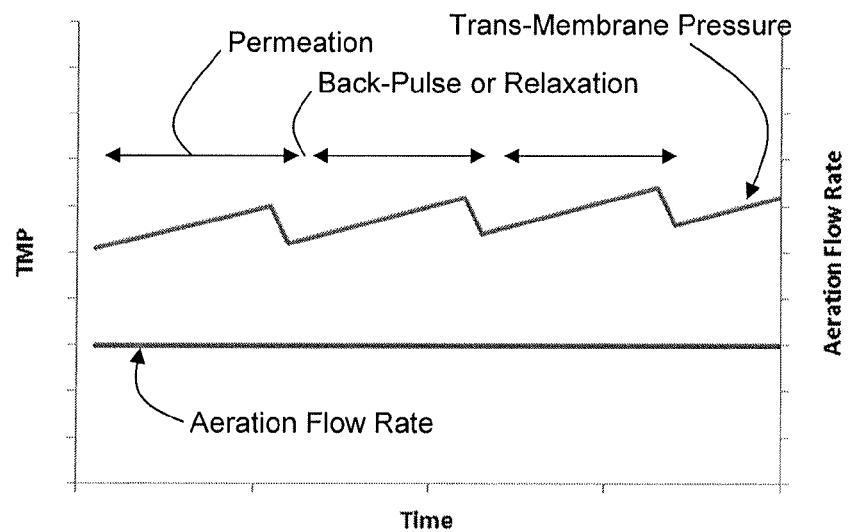
FIG. 8 illustrates a method of aerating an immersed membrane module.
Figure 9:
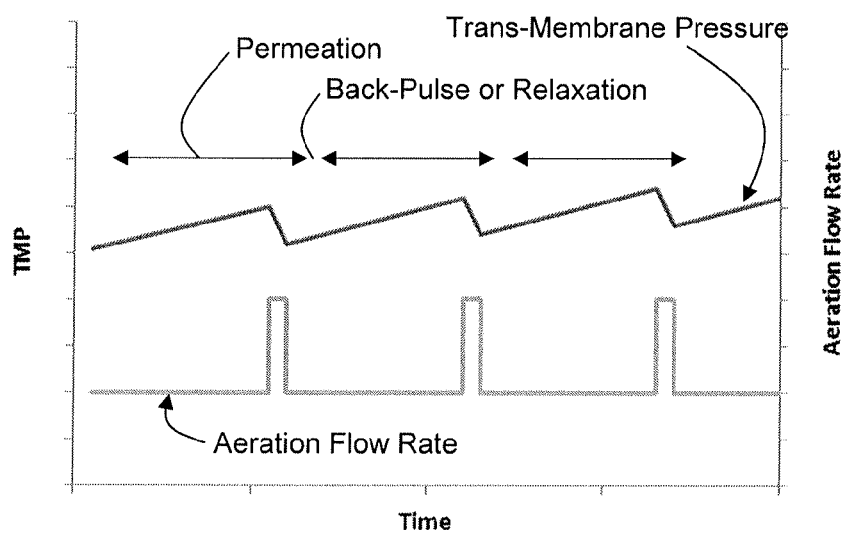
FIGS. 9-13 illustrate alternative methods of aerating an immerse module.

FIG. 8 shows a method of operating a membrane filtration system having a membrane module 50 immersed in a tank 50 as shown in FIG. 7. The filtration system may be part of a membrane bioreactor (MBR). The operation consists of periods of permeation followed by periods of either relaxation or backpulse, alternatively called backwash. The periods of permeation may be from 10 to 50 times as long as the periods of backwashing or relaxation. The membranes are scoured with bubbles from a gas delivery device 10, optionally in combination with an intermittent gas sparger 20. Scouring is used during both the permeation and the backpulse/relaxation cycles to control the accumulation of solids on the membranes and to reduce membrane fouling. FIG. 8 illustrates of a method of air scouring in which the air flow rate remains the same throughout the permeation cycle and between permeation and relaxation cycles. During the permeation cycle, transmembrane pressure (TMP) slowly builds until the backpulse/relaxation cycle where at least some solids fouling the membrane are removed from the membrane module 50. When the next permeate cycle is begun, the TMP is reduced but begins to rise throughout the permeate cycle as more solids foul the membranes.

FIGS. 9 to 13 show alternative methods of operating a membrane filtration system having a membrane module 50 immersed in a tank 50 as shown in FIG. 7. When the gas delivery device 10 is used alone, the aeration flow rates in FIGS. 8 to 13 represent both the air flow input to the gas delivery device 10 and the output of the gas delivery device 10. When the gas delivery device 10 is used in combination with an intermittent gas sparger 20, the aeration flow rates in FIGS. 8 to 13 represent the air flow input to, and output from, the gas delivery device 10 and the time-averaged output of the intermittent gas sparger 20. However, the instantaneous flow rate of the output of the intermittent gas sparger 20 does not change much, or at all, with the input flow rate. Instead, the frequency at which bursts of bubbles are released from the intermittent gas sparger 20 increases with the input gas flow rate. Accordingly, in a system having intermittent gas spargers 20, the aeration flow rates shown in FIGS. 8 to 13 may alternatively be thought of as representing the frequency of bursts of bubbles being released from the intermittent gas sparger 20.

In at least some situations, air scouring during backpulse/relaxation cycles is more effective in preventing solids accumulation and controlling membrane fouling compared to air scouring during permeation cycles. In one method, illustrated in FIG. 9, the aeration flow rate remains constant at a first aeration flow rate during the permeation cycle. The aeration flow rate is increased during the backpulse/relaxation cycle to a second aeration flow rate which is greater than the first aeration flow rate. After the completion of the backpulse/relaxation cycle and at the beginning of a new permeation cycle, the aeration flow rate is decreased to the first aeration flow rate. In some cases, the amount of energy consumed by a membrane filtration system may be reduced by using the method of FIG. 9 rather than the method of FIG. 8.

Figure 10:
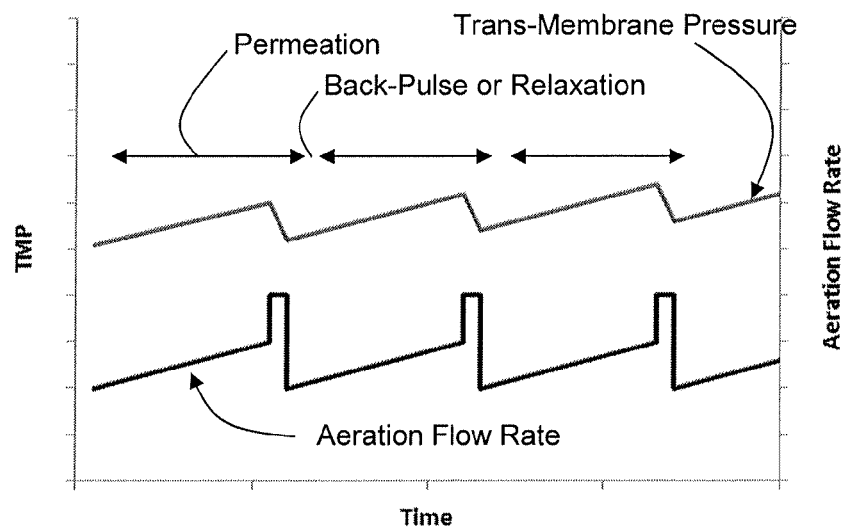

Solids build up in the module during the permeation cycle. The aeration flow rate can also be increased during the permeation cycle so that the aeration rate is higher during a later part of the cycle. FIG. 10 illustrates a method wherein the aeration flow rate at the beginning of the permeation cycle is gradually increased from a first aeration flow rate to a second aeration flow rate over the course of the permeation cycle and as solids build up. Alternatively, the aeration flow rate can go through one or more abrupt or step form changes from the first aeration flow rate to the second aeration flow rate within the permeation cycle. At the end of the permeation cycle and at the beginning of the backpulse/relaxation cycle, the aeration flow rate is increased to a third aeration flow rate. After the completion of the backpulse/relaxation cycle and at the beginning of a new permeation cycle, the aeration flow rate is decreased to the first aeration flow rate.

Figure 11:
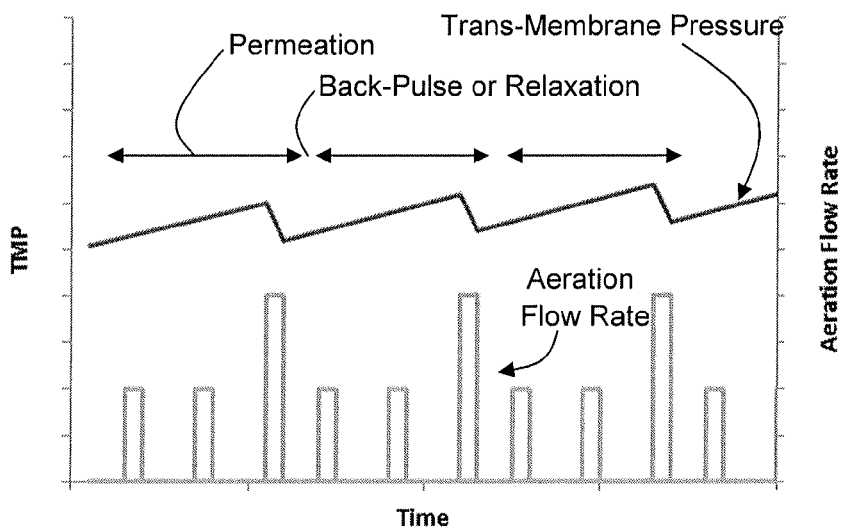

FIG. 11 illustrates a method wherein the aeration flow rate varies one or more times within a permeation cycle from a first aeration flow rate to a second aeration flow rate. During the backpulse/relaxation cycle, the second aeration flow rate or an even higher third aeration flow rate may be used. In the example illustrated, the aeration flow rate remains constant at a first aeration flow rate from the beginning of the permeation cycle. After a predetermined period of time during the course of the permeation cycle, the flow rate is increased from the first aeration flow rate to a second aeration flow rate for a predetermined period of time. After the completion of the predetermined period of time, the aeration flow rate is reduced to the first aeration flow rate. At the end of the permeation cycle and at the beginning of the backpulse/relaxation cycle, the aeration flow rate is increased to a third aeration flow rate, wherein the third aeration flow rate is greater than the second aeration flow rate. After the completion of the backpulse/relaxation cycle and at the beginning of a new permeation cycle, the aeration flow rate is decreased to the first aeration flow rate.

While FIG. 11 illustrates two occurrences of an increase of the aeration flow rate from the first flow rate to the second flow rate, any number of occurrences of an increase of the aeration flow rate may be applied during the permeation cycle. The first aeration flow rate illustrated in FIG. 11 may be any flow rate. For example, the first aeration flow rate of the air scouring method illustrated in FIG. 11 may be zero.

Figure 12:
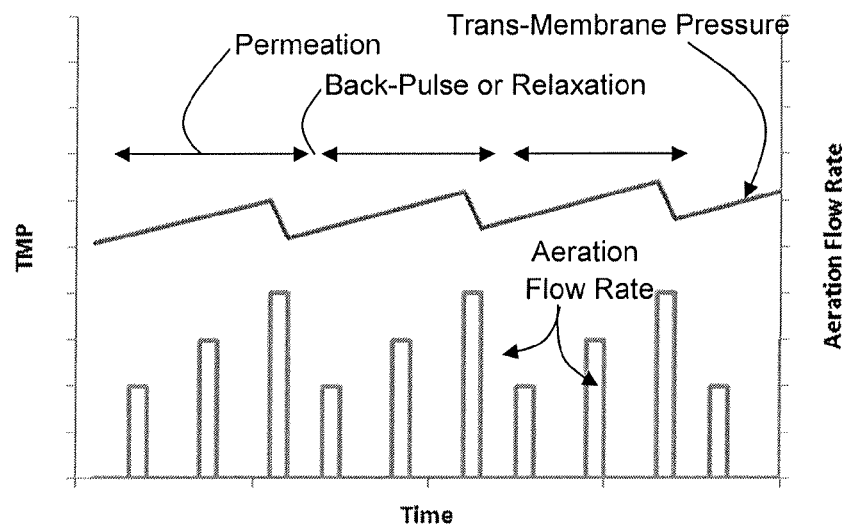

FIG. 12 illustrates a method wherein aeration is provided in distinct periods of time during the permeation cycle. The aeration flow rate increases from one distinct period of time to the next and then the aeration flow rate may be further increased during the backpulse/relaxation cycle. Optionally, a lower aeration flow rate, or no air flow, may be provided between the distinct periods of time. In the example shown, the aeration flow rate remains constant at a first aeration flow rate from the beginning of the permeation cycle. After a predetermined period of time during the course of the permeation cycle, the flow rate is increased from the first aeration flow rate to a second aeration flow rate for a predetermined period of time. After the completion of the predetermined period of time, the aeration flow rate is reduced to the first aeration flow rate. After another predetermined period of time, the flow rate is increased from the first aeration flow rate to a third aeration flow rate for a predetermined period of time, wherein the third aeration flow rate is greater than the second aeration flow rate. At the end of the permeation cycle and at the beginning of the backpulse/relaxation cycle, the aeration flow rate is increased to a fourth aeration flow rate, wherein the fourth aeration flow rate is greater than the third aeration flow rate. After the completion of the backpulse/relaxation cycle and at the beginning of a new permeation cycle, the aeration flow rate is decreased to the first aeration flow rate.

While FIG. 12 illustrates two occurrences of an increase of the aeration flow rate during the permeation cycle, any number of occurrences of an increase of the aeration flow rate may be applied during the permeation cycle. The first aeration flow rate illustrated in FIG. 12 may be any flow rate. According to one embodiment, the first aeration flow rate of the air scouring method illustrated in FIG. 12 may be zero.

Figure 13:
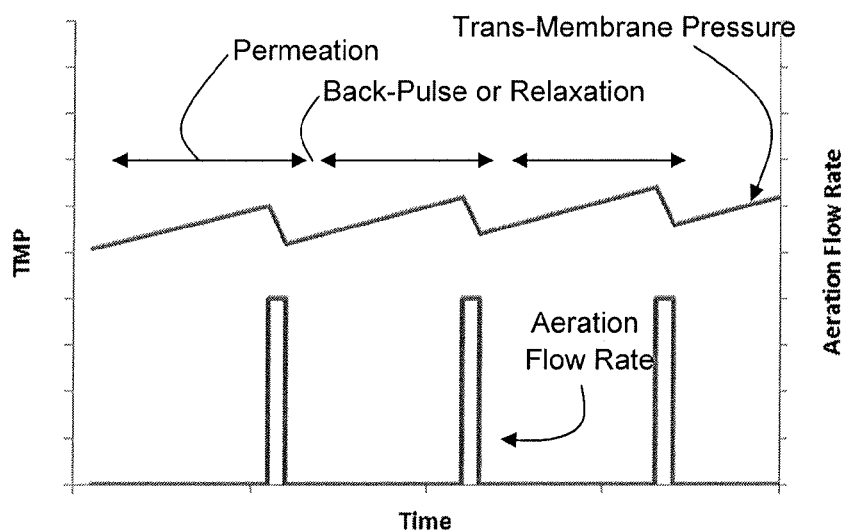

FIG. 13 illustrates a method wherein air scouring is only used during the backpulse/relaxation cycle and all aeration is discontinued during the permeation cycle. As illustrated, an aeration flow rate of zero is applied during the permeation cycle. At the end of the permeation cycle and at the beginning of the backpulse/relaxation cycle, the aeration flow rate is increased to a first aeration flow rate. After the completion of the backpulse/relaxation cycle and at the beginning of a new permeation cycle, the aeration flow rate is decreased to zero.

In the description above, one or more aeration flow rates are said to begin with the beginning of a backwash/relaxation cycle and to end with the completion of a backwash/relaxation cycle. This is meant to be approximate. The stated aeration flow rate preferably includes at least the period of time occupied by the backwash or relaxation but may begin before the backwash or relaxation, or continue after the backwash or relaxation, or both.

FIGS. 8 to 13 do not have specific time scales. However, permeation cycles typically last for 15 minutes or more, sometime 30 minutes or more. Backwash/relaxation cycles are typically at least one minute long and sometimes more than two minutes long. Changes in aeration flow rate between discrete aeration flow rates during the permeation period are preferably applied for at least one minute, more preferably for at least two minutes or five minutes. In contrast, an intermittent gas sparger 20 typically releases bursts of bubbles once every 4 to 30 seconds, more often once every 4 to 15 seconds. Accordingly, the changes in aeration flow rate shown in FIGS. 8 to 13 do not represent individual bursts of bubbles from an intermittent gas sparger 20. Instead, if an intermittent gas sparger 20 is used, it typically releases a plurality of bursts of bubbles within a period of time shown as having a particular aeration flow rate.

The aeration flow rate (or frequency of bursts of bubbles from an intermittent gas sparger 20) could also be controlled considering one or more properties of feed water, of water in a process tank of a bioreactor or the tank 52 containing a membrane module 50, or considering the performance of the membrane module 50. Viscosity, mixed liquor suspended solids (MLSS) concentrations, extracellular polymer (ECP) concentrations, soluble microbial product (SMP) concentrations, a fouling index, temperature, and a rate of membrane fouling or recovery of flux after backwashing are some of the properties that could be used to control aeration flow rate, to determine when to change between one or more of the methods shown in FIGS. 8 to 13, or to control the timing of changes between aeration flow rates in a method shown in FIGS. 9 to 13. For example, a higher aeration flow rate, or more time at a higher aeration flow rate, or a change to a more intensive aeration process may be applied as the viscosity of water being fed to the filtration system of the tank 52 increases or its temperature decreases. In another example, a higher aeration flow rate, or more time at a higher aeration flow rate, or a change to a more intensive aeration process may be applied at higher MLSS concentrations. In another example, a higher aeration flow rate, or more time at a higher aeration flow rate, or a change to a more intensive aeration process may be applied when electricity may be obtained at a lower cost.

Optionally, to reduce the frequency of changes in the speed of a blower providing gas to a plurality of gas delivery devices 10 (alone or in combination with intermittent gas spargers 20), a valve set may be provided between a blower and the gas delivery devices 10. The valve set distributes the flow provided by the blower between two or more distinct branches of an air delivery system connected to the gas delivery devices such that flow in one distinct branch may vary in a time period during which the blower output does not vary. For example, at one period of time a higher aeration flow rate is applied to a first distinct branch and a lower aeration flow rate is applied to a second distinct branch, while at a second period of time the higher aeration flow rate is applied to the second distinct branch and the lower aeration flow rate is applied to the first distinct branch. Alternatively or additionally, the blower may provide air at a generally constant rate to a pressure tank or other accumulator while a valve between the pressure tank and the gas delivery device 10 is modulated to provide the required variation in aeration flow rate.

Optionally, gas delivery devices 10 may also be connected to a cyclic aeration system as used in some MBRs with ZEEWEED™ hollow fiber elements sold by GE Water and Process Technologies. In this case, even without an intermittent gas sparger 20, the gas delivery device 10 produces a flow of bubbles for a period of about 2 to 20 seconds followed by a period in which the gas delivery device 10 produces a lesser flow of bubbles or no bubbles for a period of about 2 to 60 seconds, these periods alternating in repeated cycles over time. For example, one gas delivery device 10 can produce bubbles for 10 seconds and then be off for 10 seconds while a second gas delivery device is off for 10 seconds and then produces bubbles for 10 seconds. In this case, in the methods of FIGS. 8 to 13, the aeration flow rate can be interpreted as a time averaged aeration flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of air scouring an immersed membrane comprising adjusting one or more aeration parameters: between successive permeation, backpulse or relaxation cycles; during a permeation cycle; or between a permeation cycle and a backpulse or relaxation cycle wherein air scouring during the backpulse or relaxation cycle comprises releasing a series of bursts of bubbles;

wherein aeration is provided by a gas delivery device comprising:

a manifold adapted to be connected to a source of a pressurized gas; and a plurality of open-bottomed channels, each of the plurality of channels having a single outlet and being in fluid communication with the manifold through a distinct associated port.

2. A method of air scouring an immersed membrane comprising adjusting one or more aeration parameters: between successive permeation, backpulse or relaxation cycles; during a permeation cycle; or between a permeation cycle and a backpulse or relaxation cycle wherein air scouring during the backpulse or relaxation cycle comprises releasing a series of bursts of bubbles;

wherein aeration is provided by a gas delivery device comprising:

a distribution plenum adapted to be connected to a source of a pressurized gas; and, a plurality of channels, each of the plurality of channels being in fluid communication with the distribution plenum through a distinct associated port, each of the plurality of channels having an outlet at the end of the channel adapted to discharge gas, wherein the ports have a smaller area than the channels and the ports are located close together relative to a variation in the lengths of the channels.

3. A method of air scouring an immersed membrane comprising adjusting one or more aeration parameters: between successive permeation, backpulse or relaxation cycles; during a permeation cycle; or between a permeation cycle and a backpulse or relaxation cycle wherein air scouring during the backpulse or relaxation cycle comprises releasing a series of bursts of bubbles;

and further comprising:

bringing a flow of pressurized gas into a tank to a manifold near or below the bottom of a membrane module;

splitting the flow of pressurized gas into multiple flows of pressurized gas extending from the manifold;

directing each of the multiple flows of pressurized gas to a different lateral position, such that each of the multiple flows of pressurized travel a different distance from the manifold; and releasing bubbles from the different lateral positions.

4. The method of claim 1, wherein an aeration flow rate is varied between successive permeation cycles.

5. The method of claim 1, wherein air scouring during the permeation cycle comprises releasing a series of bursts of bubbles and an aeration flow rate is increased during a backpulse or relaxation cycle relative to the aeration flow rate during a preceding permeation cycle.

6. The method of claim 1, wherein an aeration flow rate is increased within a permeation cycle.

7. The method of claim 1, wherein aeration is provided intermittently during a permeation cycle.

8. The method of claim 1, wherein aeration is provided only during a backpulse or a relaxation cycle.

9. The method of claim 1, wherein a continuous or instantaneous aeration flow rate increases generally linearly over time during a permeation cycle.

10. The method of claim 2, wherein an aeration flow rate is varied between successive permeation cycles.

11. The method of claim 2, wherein air scouring during the permeation cycle comprises releasing a series of bursts of bubbles and an aeration flow rate is increased during a backpulse or relaxation cycle relative to the aeration flow rate during a preceding permeation cycle.

12. The method of claim 2, wherein an aeration flow rate is increased within a permeation cycle.

* * * * *

UNITED STATES PATENT AND TRADEMARK OFFICE
CERTIFICATE OF CORRECTION

PATENT NO. : 10,765,976 B2
APPLICATION NO. : 14/442807
DATED : September 8, 2020
INVENTOR(S) : Gavin James Boyle et al.

It is certified that error appears in the above-identified patent and that said Letters Patent is hereby corrected as shown below:

In the Claims

In Column 10, Line 9, in Claim 3: delete "flows of pressurized travel" and replace with "flows of pressurized gas travel".

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*